(12) United States Patent
De Gaillard (10) Patent No.: US 7,055,879 B2
(45) Date of Patent: Jun. 6, 2006

(54) MOTOR VEHICLE WITH A CARGO SPACE AND CARGO SPACE DOOR

(75) Inventor: Francois De Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 11/114,016

(22) Filed: Apr. 26, 2005

(65) Prior Publication Data

US 2005/0189778 A1 Sep. 1, 2005

Related U.S. Application Data

(62) Division of application No. 10/353,086, filed on Jan. 29, 2003, now Pat. No. 6,921,492.

(30) Foreign Application Priority Data

Jan. 29, 2002 (DE) .................. 102 03 538

(51) Int. Cl.
*B62C 1/06* (2006.01)
(52) U.S. Cl. .................. 296/26.08; 296/50; 296/146.8; 296/146.11; 296/216.01
(58) Field of Classification Search ............. 296/26.09, 296/26.01, 26.08–26.11, 37.6, 50–51, 147, 296/146.8, 146.11, 100.02–100.03, 100.06–100.07, 296/216.01–216.03, 219
See application file for complete search history.

(56) References Cited

U.S. PATENT DOCUMENTS

| | | | |
|---|---|---|---|
| 2,172,405 A | 9/1939 | Powell | |
| 2,284,419 A | 5/1942 | Greig | |
| 3,004,790 A | 10/1961 | Mayer | |
| 3,387,406 A | 6/1968 | Coker et al. | |
| 3,416,677 A * | 12/1968 | Abfalter | 414/545 |
| 3,605,173 A * | 9/1971 | Lautenschlager, Jr. | 16/250 |
| 3,666,122 A * | 5/1972 | Youmans | 414/534 |
| 3,888,539 A | 6/1975 | Niessner | |
| 4,076,301 A | 2/1978 | Gergoe | |
| 4,111,317 A * | 9/1978 | Robinson | 414/680 |
| 4,272,121 A | 6/1981 | Kim | |
| 4,681,360 A | 7/1987 | Peters et al. | |
| 5,127,697 A | 7/1992 | St. Marie | |
| 5,456,511 A | 10/1995 | Webbr | |
| 5,564,767 A | 10/1996 | Strepek | |
| 5,669,654 A | 9/1997 | Eilers et al. | |
| 5,692,792 A | 12/1997 | Klar (minor) | |

(Continued)

FOREIGN PATENT DOCUMENTS

EP 001188614 * 3/2002

*Primary Examiner*—H. Gutman
(74) *Attorney, Agent, or Firm*—David S. Safran (57) ABSTRACT

A motor vehicle, especially a passenger utility vehicle, e.g., a station wagon or SUV with a cargo space (3) which is located in the rear (2) of the vehicle, a cargo floor (16) which can be extended rearward, a cargo space door (44) for opening and closing the rear cargo space opening, and at least one roof movable panel for opening and closing a roof opening, in which a continuous opening combining the rear cargo space opening and the roof opening is formed when both the at least one rear roof panel and the cargo space door are in their open positions. In one advantageous embodiment, the cargo space door (44) is mounted to the vehicle body by a four bar mechanism for movement outward and downward from the closed position to the open position.

7 Claims, 8 Drawing Sheets

U.S. PATENT DOCUMENTS

| | | |
|---|---|---|
| 5,816,637 A | 10/1998 | Adams et al. |
| 5,944,371 A | 8/1999 | Steiner et al. |
| 6,305,740 B1 * | 10/2001 | Staser et al. ................ 296/222 |
| 6,485,094 B1 | 11/2002 | Corder et al. |
| 6,502,885 B1 | 1/2003 | Gammon et al. |
| 6,705,656 B1 | 3/2004 | Keller |
| 6,805,393 B1 | 10/2004 | Stevenson et al. |
| 6,834,903 B1 | 12/2004 | Harper et al. |
| 2002/0105201 A1 | 8/2002 | Melotik et al. |
| 2003/0122396 A1 | 7/2003 | Humprey et al. |
| 2004/0232732 A1 | 11/2004 | Engelgau |
| 2005/0073167 A1 * | 4/2005 | De Gaillard ................ 296/76 |

* cited by examiner

MOTOR VEHICLE WITH A CARGO SPACE AND CARGO SPACE DOOR

CROSS-REFERENCE TO RELATED APPLICATIONS

This application is a divisional of application Ser. No. 10/353,086, filed Jan. 29, 2003, now U.S. Pat. No. 6,921,492.

BACKGROUND OF THE INVENTION

1. Field of the Invention

The invention relates to a motor vehicle, especially a passenger utility vehicle, with a cargo space located in the rear of the vehicle and a cargo space door for the rear cargo space.

2. Description of the Related Art

U.S. Pat. No. 4,272,121 discloses a station wagon which contains a cargo space and a rear cargo space door which is coupled to the body laterally around a vertical pivot axis. The cargo space door contains a rear window which can be lowered into the cargo space door and which is guided without a frame above the cargo space door. The rear section of the motor vehicle roof contains a roof opening which can be closed by a cover which is movably supported on the motor vehicle roof. When the cover is pushed forward, the roof opening passes into the cargo space opening which has been opened when the rear window is lowered, without interruption by a rear roof cross frame.

U.S. Pat. No. 5,944,371 discloses a vehicle with a cargo space and a cargo floor which is located in it, which is supported on at least three rollers on the body and which can be extended out of the cargo space to the rear roughly parallel to the vehicle bottom.

U.S. Pat. No. 5,692,792 discloses a station wagon which has a rear hatch which can be swung up and which is coupled to the motor vehicle roof. In the cargo space, a retractable draw-like cargo space floor is movably accommodated; it has side walls and on its back a rear wall which can also be pivot around a lower transverse pivot axis. The entire rear cargo space opening is thus covered by two hatches or doors. According to one embodiment, the rear hatch, which is coupled at the top, also covers the rear wall of the cargo floor.

U.S. Pat. No. 3,004,790 discloses a passenger car with a trunk which has a trunk space which is covered by two hatches which are located next to one another and extend in the lengthwise direction of the vehicle and which can be swung up around outer longitudinal pivot axes. The trunk space contains a cargo floor which can be extended to the rear, with fixed side walls and a rear hatch which is displaceable around a rear transverse pivot axis on the back end of the cargo floor between a vertical closed position and a folded-down loading position.

SUMMARY OF THE INVENTION

The primary object of the present invention is to provide a vehicle of the initially mentioned type with a cargo space which has a variable useful volume with good accessibility.

This object is achieved by a motor vehicle, especially a passenger utility vehicle, with a cargo space which is located in the rear of the vehicle, a cargo floor which can be extended in the rear, and a cargo space door for the rear cargo space opening which is pivotally supported on the cargo floor. In this motor vehicle, the cargo space door, which can also be called the rear hatch, is pivotally mounted on the cargo floor for the rear cargo space opening and can assume several operating positions. The cargo space door can both close the entire cargo space opening in the rear in the conventional manner and can also be moved away from the vehicle to the rear with the cargo floor when the latter has been extended.

In one feasible embodiment, the cargo space door is supported on the back end of the cargo floor to be able to pivot around a transverse axis and can be extended and retracted with the cargo floor in the closed position. The cargo space door which is folded into the horizontal position, for example, and which is locked in it can lengthen the cargo area or cargo floor even more.

The cargo floor is likewise made flat, or on one or both sides, contains at least one upwardly projecting side structure. This side structure can also be used as the lateral boundary of the cargo floor relative to the inner side walls of the vehicle or can also offer a bearing and guide function for the cargo floor in conjunction with guide means.

In addition, the cargo space door is supported to be able to pivot around a vertical axis on the side structure. The vertical axis pivoting of the cargo space door has the great advantage that, with the cargo space door opened sideways, immediate access to the cargo floor without having to pivot down the cargo space door around the transverse axis. The cargo space door can be pivotally mounted both on the right side and also on the left side, and when using multifunction hinges which are used with a switching capacity either as a pivot joint or a lock means, can be switched between the left-side and right-side pivot support. Furthermore, a heavy cargo space door can also manually pivot more easily around a vertical axis than a cargo space door which is pivotally mounted around a transverse axis.

Preferably, the cargo floor has side walls on both lateral sides and the cargo space door is supported to be able to pivot around the vertical axis on one of the side walls.

The cargo space door, feasibly, the back end of the motor vehicle roof on its top end borders, and the top part which is supported on the bottom part of the cargo space door can be lowered onto or into the bottom part and can be extended as far as the back end of the motor vehicle roof. By lowering the top part, a loading opening can be cleared. In particular, the top part is a rear window which is guided on the bottom part and which is guided without a frame above the bottom part of the cargo space door. The rear window then tightly adjoins the seals on the body.

In one preferred embodiment, the vehicle roof has a movable rear section for closing or clearing the rear roof opening. If the rear section is removed from the roof opening and the roof opening is cleared, the cargo space or cargo floor can be used essentially without vertical limitation by the motor vehicle roof. One special advantage arises when the rear roof opening passes without a boundary through the transverse rear roof frame into the cargo space opening which can be closed by the cargo space door. This yields a cargo space in the manner of a pickup which is protected laterally by the side walls of the motor vehicle and the rear side windows as far as the lateral roof frame or lengthwise roof members.

The rear section of the motor vehicle roof is, for example, a movable cover, especially a glass cover which can be moved on the motor vehicle roof between its rear closed position and the front open position, for example, over the front roof skin.

Functionally on one side wall of the cargo floor, there is at least one pivot bearing means for the laterally pivoting the cargo space door, and on the opposing side wall, there is a closing means for the cargo space door. The cargo space door is thus closed on the cargo floor regardless of the extension position of the cargo floor.

If the pivot bearing means has an arc-shaped guide which produces a swinging motion about an effective vertical pivot axis which lies outside the cargo space door, the cargo space door, which projects laterally over the side walls, can also rest from the outside against a seal which is attached to the body and at least partially surrounds the cargo space opening.

The cargo floor is, for example, movably supported via a central lower guide, especially a telescoping guide, on the vehicle body underneath the cargo floor. In addition, the cargo floor can be supported on its two side walls via body-mounted guides.

The cargo floor can be manually pushed and fixed in the catch position or it is moved by a drive means.

Several embodiments of the vehicle in accordance with the invention are explained in detail below with reference to the accompanying drawings.

DETAILED DESCRIPTION OF THE INVENTION

A passenger vehicle 1 (see FIG. 1), such as a station wagon or sport utility vehicle (SUV), or the like, contains a vehicle rear 2 in the form of a windowed squareback, fastback or hatchback with a rear cargo space 3 which is bordered on the rear side by a rear hatch or cargo space door 4. For purposes of generically encompassing all such vehicles with a windowed cargo space, the term "passenger utility vehicle" will be used herein and in the claims. Thus, while a station wagon or sport utility vehicle is shown in the drawings, the invention is not intended to be limited thereto.

In the illustrated passenger utility vehicle, the cargo space door 4 contains, as the top part, a rear window 5 which is movable supported on the bottom part 6 of the cargo space door 4 and can be lowered onto it or into it, so that the cargo space 3 with the rear window 5 lowered is accessible from the outside through the rear window opening and the motor vehicle interior can be ventilated. The rear window 5 is preferably guided only on the bottom part 6 of the cargo space door 4, and thus, in its upper closed position it is not surrounded by a window frame of the cargo space door 4.

The closed rear window 5, with its top edge 7, borders the rear edge 8 of the rear roof part 9 which is movably supported on the motor vehicle roof 10 and which can be moved out of its closed position (FIGS. 1 and 2), via intermediate positions, into its open position (FIGS. 3 to 5), located forward over the front roof section 11. The front roof section 11 can have a fixed or movable, and especially transparent, cover 12 which closes a front roof opening. The rear roof part 9, when it is displaced forward, clears the rear roof opening 13 which is bordered by the lateral roof members 14. However, since the motor vehicle roof 10 does not have a rear transverse roof frame on the back end of the rear roof opening 13, the rear opening 13 passes without interruption through an intermediate part into the rear cargo space opening 15 when the rear window 5 is lowered or the cargo space door 4 is opened (see FIG. 3, for example).

Figure 8:
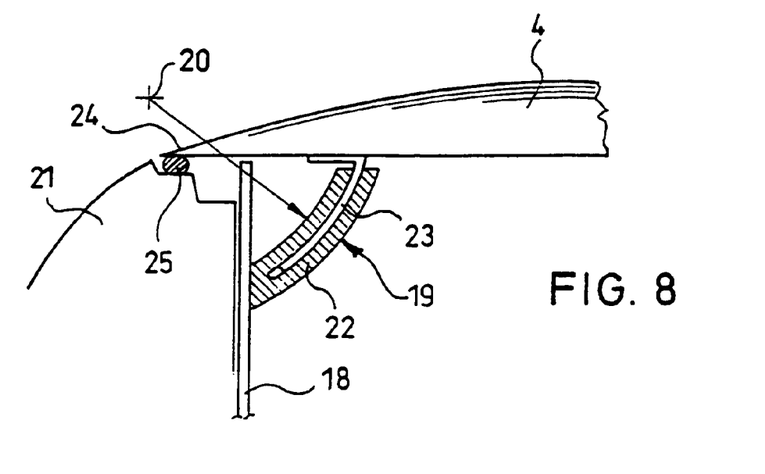
FIG. 8 is a partially sectioned, schematic top view of the support of the cargo space door on the cargo floor.

In its cargo space 3, the passenger car 1 contains a movable cargo floor 16 which is movably supported via rails and rolling or sliding elements on the vehicle body and can be pushed or extended out of the cargo space 3 to the rear. The cargo floor 16 contains two opposed fixed side parts or side walls 17, 18 which project upward from the cargo floor 16. On the side wall 18, which is the right wall with respect to the passenger vehicle 1, the cargo space door 4 is pivotally attached by a joint or hinge means 19 so that it can be swung around an effective vertical axis 20 (FIG. 8) which is located, for example, laterally outward of the cargo space door 4 and behind a rear body part 21, for example, the back end of the rear side part or fender.

The hinge 19 contains, for example, an arcuate guide 22 in which a correspondingly formed bearing part 23, which is attached to the cargo space door 4, is movably guided. The cargo space door 4 projects laterally over the side walls 17, 18, so that the side edge 24 of the cargo space door 4, when the cargo space door 4 is closed, adjoins a seal 25 which is attached to the body part 21. The opposing side edge of the cargo space door 4 adjoins a corresponding door seal on the opposite side. On the left side wall 17, which is opposite the hinge 19, there is a closing means 26 for the cargo space door 4, the lock 27 of the closing means being located, for example, on the side wall 17 and a latch pin 28 being located on the cargo space door 4 (or also vice versa). Of course, the hinge 19 can also be attached to the left side wall 17 so that the cargo space door 4 which is supported to be able to swivel to the left swivels in the opposite swivel direction.

The cargo space door 4 can thus be opened from its closed position (FIG. 1) in which it closes the rear cargo space opening 15 by swinging around its hinge 19, and the rear window 5 can be closed or lowered.

Furthermore, the closed cargo space door 4 can be extended to the rear with the cargo floor 16 (FIG. 6), and here too, the rear window 5 can be closed or lowered. This position can be used to load the cargo space 3 with the cargo space door 4 closed with respect to the cargo floor 16, but extended out to the rear with the cargo floor 16.

Figures 1, 2, 3, 4, 5, 6:
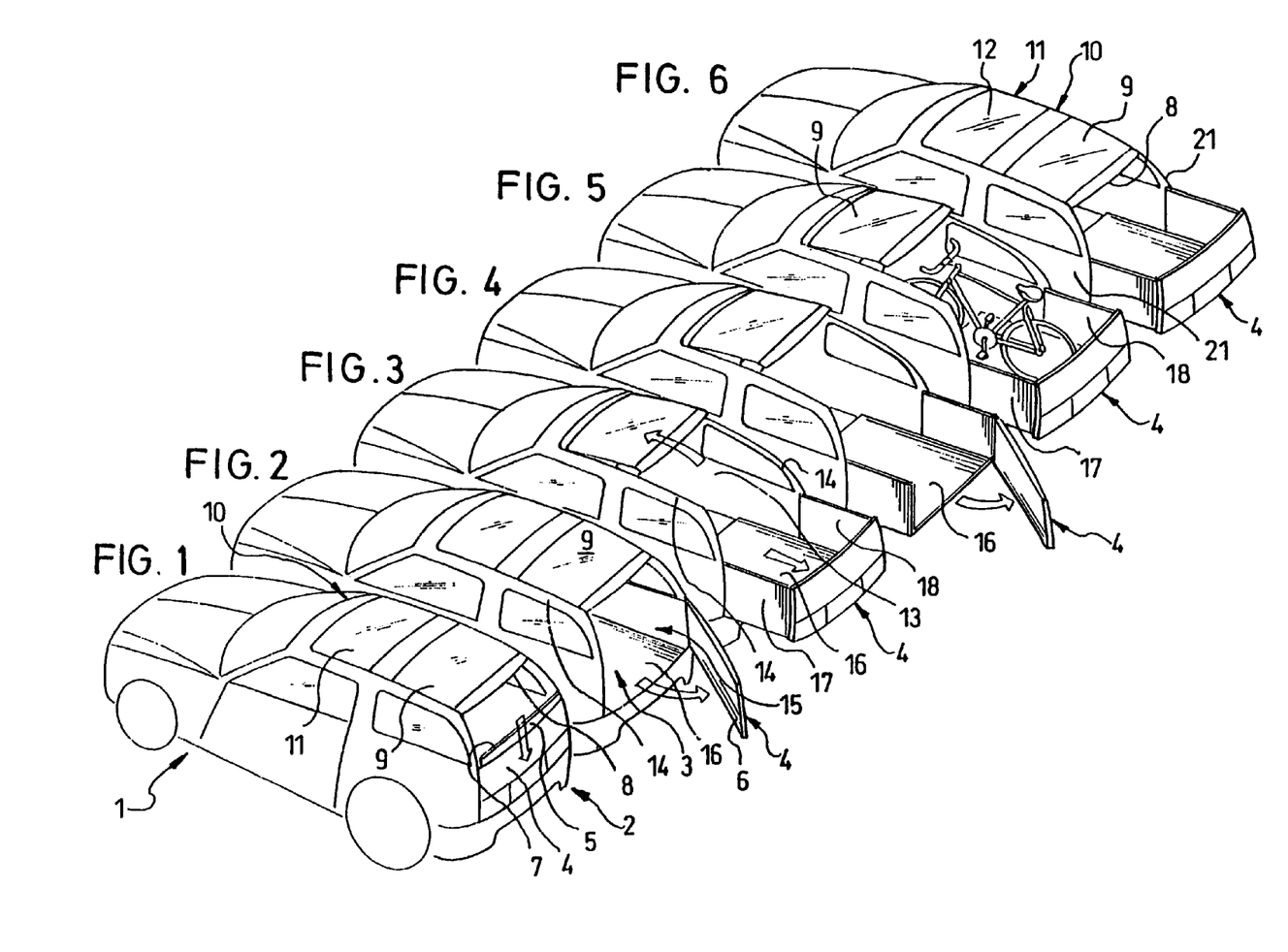
FIG. 1 is a perspective rear view of the passenger vehicle with a rear cargo space and a closed cargo space door.
FIG. 2 is a perspective rear view showing the passenger vehicle with the cargo space door opened.
FIG. 3 is a perspective rear view the passenger vehicle with the cargo floor extended to the rear and the closed cargo space door supported on it and an opened rear roof section.
FIG. 4 is a perspective rear view as shown in FIG. 3, but with the cargo space door opened.
FIG. 5 is a perspective rear view as shown in FIG. 3 with the passenger vehicle in the opened loading position with cargo held in the cargo space.
FIG. 6 is a perspective rear view of the passenger vehicle with the cargo floor extended with the cargo space door closed on the cargo floor and the rear roof section closed.
Figure 7:
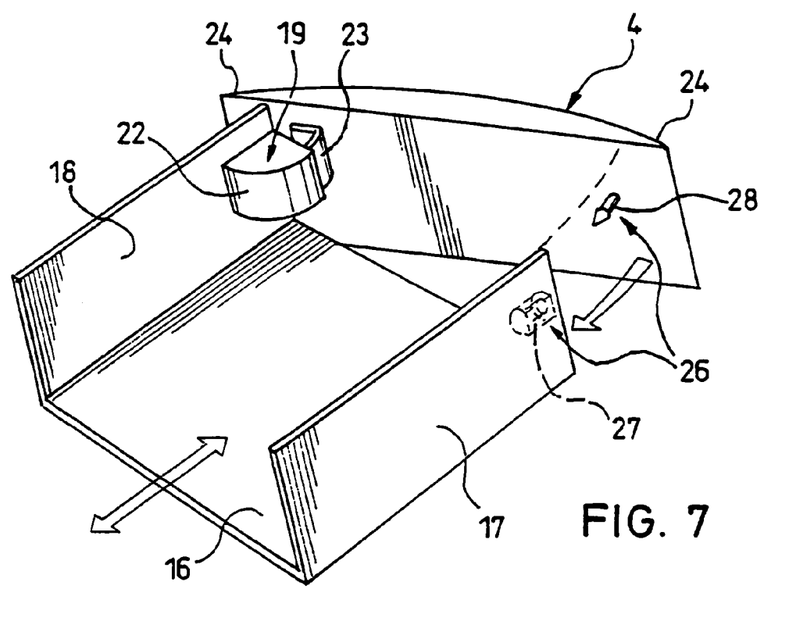
FIG. 7 is a perspective top view of the run-out cargo floor with the cargo space door laterally supported on it.

The rear roof part 9 can be moved forward both with the cargo space door 4 closed and adjoining the body, and also with the cargo floor 16 extended to the rear to open the rear roof opening 13 (FIG. 3). In this way, the cargo space 3 in the area of the roof opening 13 can be extended upward without limitation, and with the cargo floor 16 extended, the cargo space 3 is lengthened to the rear by the amount of extension. Since the rear window 5 is removed from its closed position on the body, in this way, the enlarged cargo space 3 is free and unobstructed to the top.

With the cargo floor 16 extended (see FIGS. 4 & 6), the cargo space door 4 can be opened and closed with respect to the cargo floor 16. In this way, the cargo floor 16, in any extended position, can be closed to the rear and can still also be accessible from the rear. The cargo space door 4 which swings laterally makes it possible to directly approach the fixed cargo floor 16; this is not possible for a rear hatch or cargo space door which is coupled to pivot around a transverse axis at the rear edge of the cargo floor.

The cargo floor 16 can have on its front, towards the vehicle interior, a boundary or front wall between the side walls. However, if it is formed without a border, with the cargo floor 16 extended to the rear, the lengthening towards the motor vehicle interior can also be used.

Figure 9:
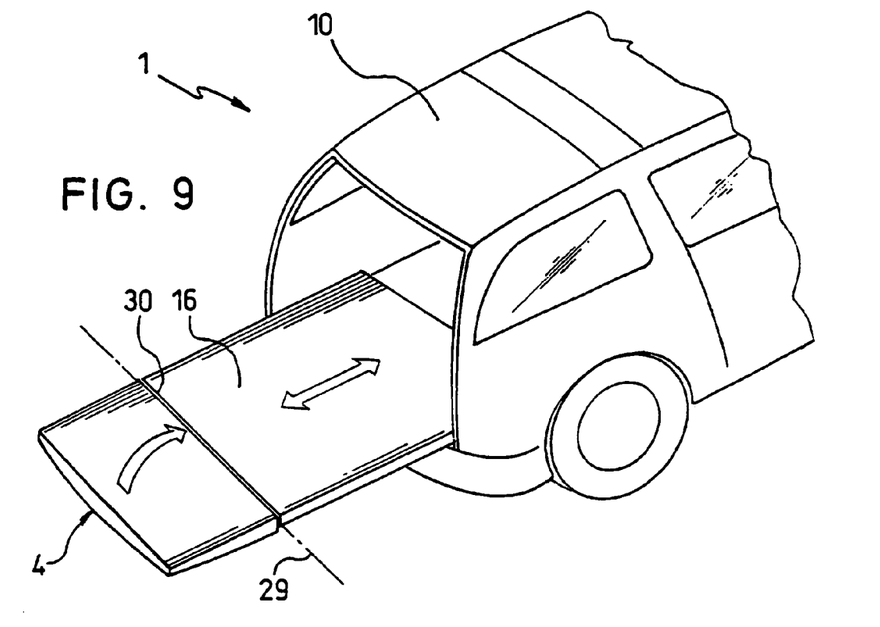
FIG. 9 is a perspective rear view of a station wagon with a modified embodiment of the cargo floor with a horizontally coupled cargo space door.
Figure 10:
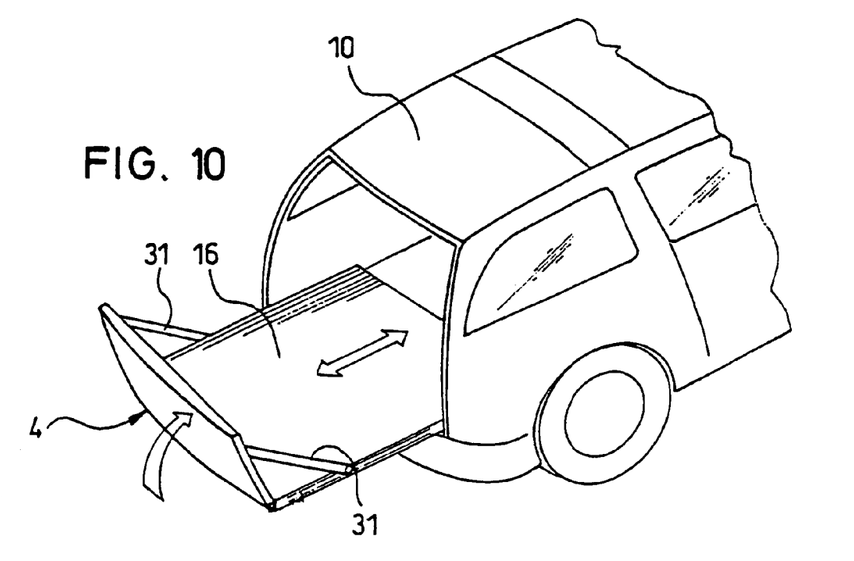
FIG. 10 is a perspective rear view of the station wagon as shown in FIG. 9 with the cargo floor extended and the cargo space door swung partially up.

In a simplified embodiment, the cargo floor 16 does not contain side walls and is thus formed only as a flat surface (see FIGS. 9 & 10). The cargo space door 4 is mounted to be able to pivot around a transverse axis 29 on the rear edge 30 of the cargo floor 16 by a pivot bearing means (not shown in FIG. 9) and can be swung by means of lateral levers 31 (FIG. 10) which are supported to be able to move and pivot on the sides of the cargo floor 16 and which can be actuated by a drive means. The operating possibilities and possible applications correspond to those of the preceding embodiment. The roof 10 of the passenger utility vehicle 1 can be closed or also provided with a closable opening, such as, for example, as shown in FIGS. 1 to 6, so that a continuous rear roof opening with an enlarged cargo space can likewise be formed.

However, the cargo space door 4 can also be supported as in the first embodiment (see, FIGS. 1 to 6) on the rear edge of the cargo floor 16 around a transverse pivot axis.

The movable cargo floor 4 can also be used in a pickup or such a vehicle which has a rear cargo surface which is encompassed to the top or is bordered by a fixed roof or a roof which can be at least partially opened.

The roof part 9 can also be manually moved by a conventional drive means, or in a simple configuration, in order to achieve an economical design. The rear roof part can also be made in other forms as a one-part or multiple part folding or sliding means.

Figures 11, 12, 13:
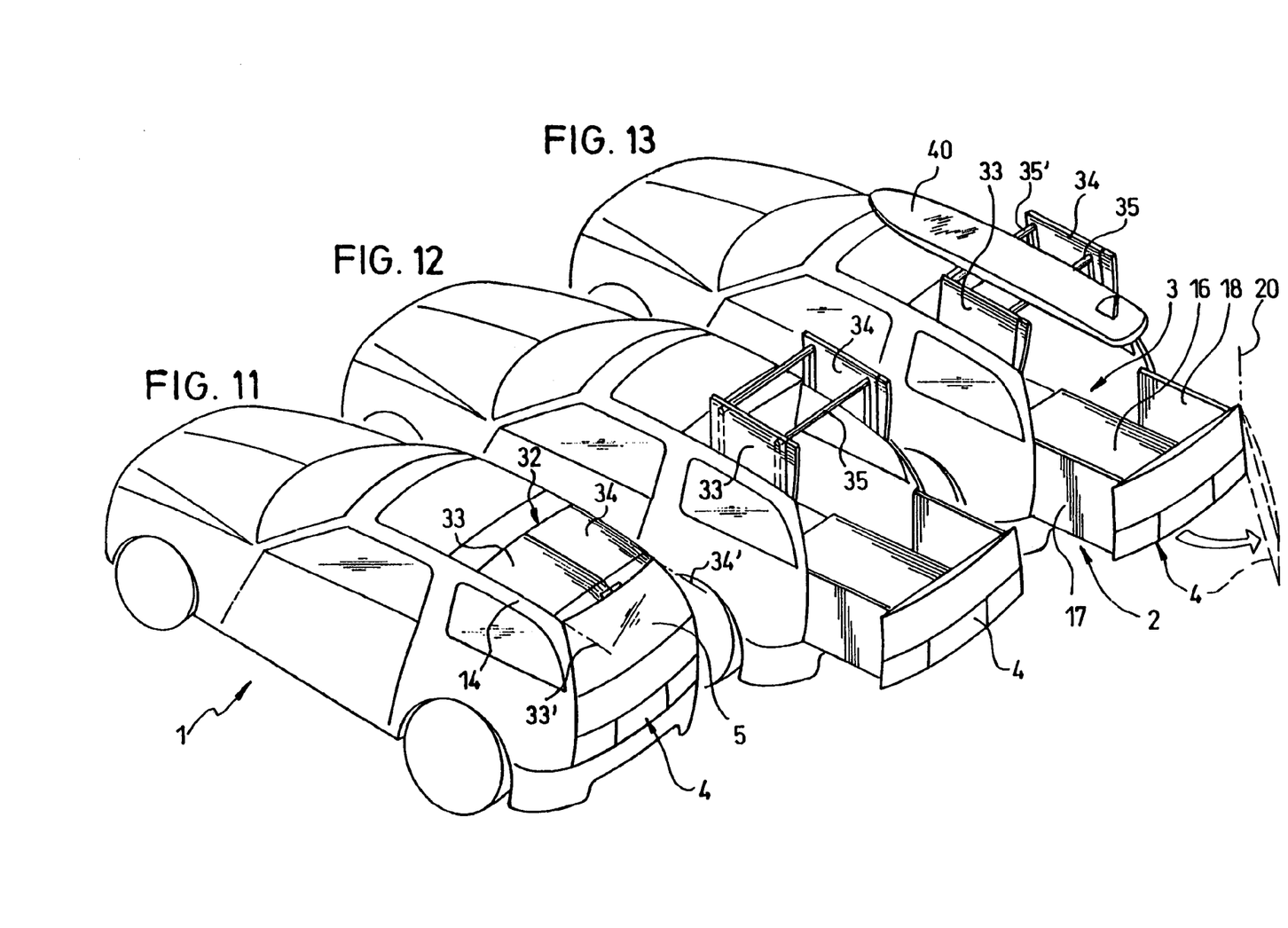
FIGS. 11 to 13 are perspective rear views of another embodiment of the station wagon with a modified roof closing means for the rear roof opening in different positions.

The embodiment of a passenger vehicle 1 which is shown in FIGS. 11 to 13 contains a cover means 32 which has been modified relative to the movable roof part 9 of the embodiment as shown in FIGS. 1 to 6 for selectively opening or closing the rear roof opening 13. Cover means 32 has a left cover 33 and a right cover 34 which extend in the lengthwise direction of the vehicle and are supported to be able to pivot around a respective pivot axis 33', 34' which is located on a respective one of the side roof members 14. The covers 33, 34 can be made of metal or plastic and also of transparent material (glass cover).

Figure 20:
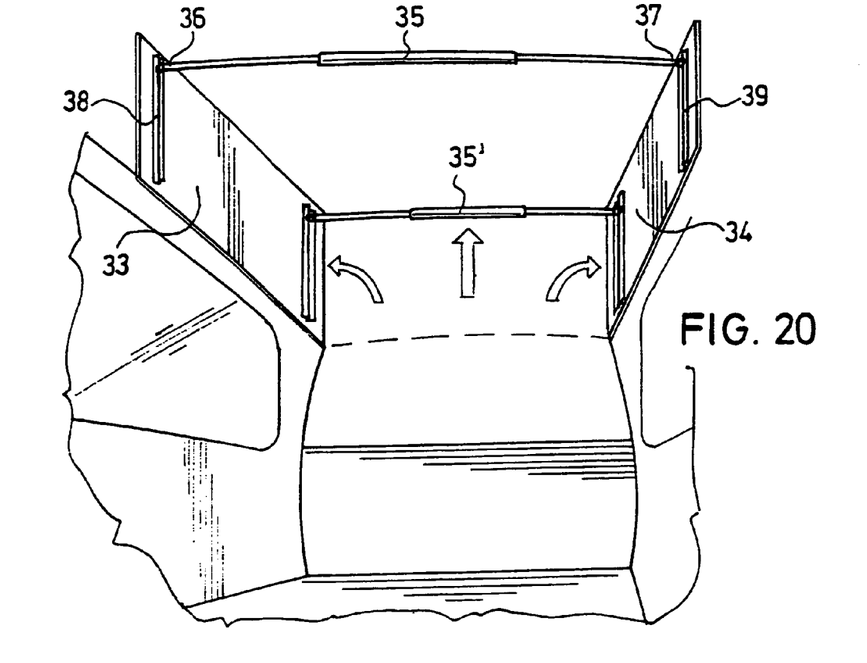
Figure 21:
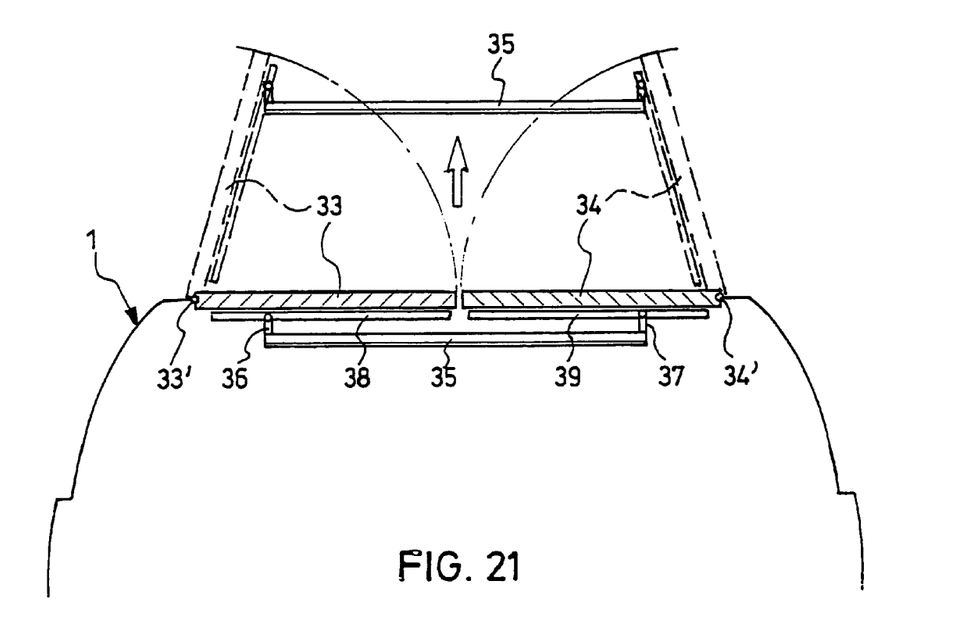
FIG. 21 is a rear view of roof and the roof closing means.

A raising mechanism for the covers 33 and 34 contains a rear crossbar 35 which on its respective ends 36, 37 (FIG. 20) is connected inside and toward the back of the doors by means of rolling or sliding elements in assigned guides 38, 39 on the left cover 33 and the right cover 34. There is a corresponding front crossbar 35' with the same bearing and guide elements in the front area of the two covers 33, 34. To open the two covers 33, 34, the two crossbars 35, 35' are pressed manually upward after a closure for the two covers 33, 34 has been unlocked, the ends 36, 37 sliding along in the guides 38 and 39 and the two covers 33, 34 swinging up around their pivot axes 33', 34' until the opened position is reached (FIGS. 12, 20 and 21), in which depending on the design they are roughly vertical or also tilted. The ends 36, 37 can be locked in the guides 38, 39 in the upper end position or also in the intermediate positions so that the open position of the covers 33, 34 can be permanently adjusted and locked.

The crossbars 35, 35' which are locked in the open position of the covers 33, 34 can be used as load bearing means and can carry loads or articles 40, such as a surfboard. In one simple version, the raising mechanism can also have only one crossbar. According to one version, the raising mechanism contains a drive means with which one or both crossbars are pushed along their guides on the covers 33, 34, and in doing so, swing the covers 33, 34 open and closed. The cargo floor 16 and the cargo space door 4 and their operation and actuation capacity correspond to that of the initially described embodiment.

Figure 18:
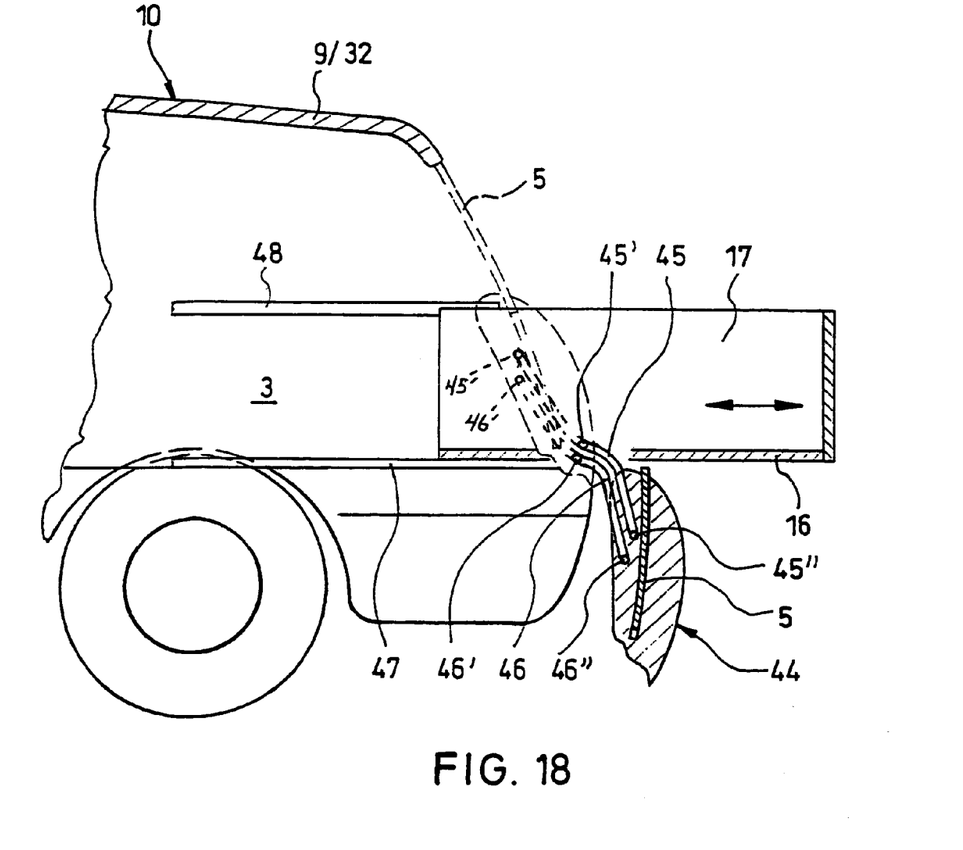
FIG. 18 is a schematic side view of the motor vehicle rear with the cargo space door of FIGS. 14 to 17.
Figure 19:
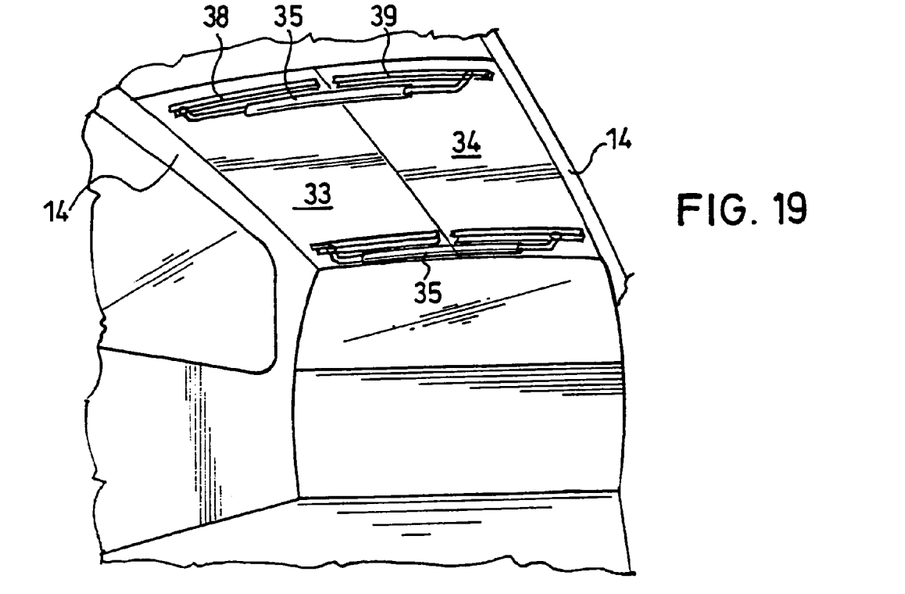
FIGS. 19 & 20 are interior perspective views showing the roof closing means of FIGS. 14 to 17 in the closed position and in the open position, respectively.

Another embodiment of the motor vehicle 1 contains the motor vehicle roof which is described using FIGS. 11 to 13 and 19 to 21 with two covers 33, 34 and the run-out cargo floor 16, but with a differently supported cargo space door 44. The cargo space door 44 (see FIG. 18) can be actuated by means of a guide lever mechanism with two connecting rods 45, 46 which parallelly swing out of their closed position in the cargo space opening 15 (shown with the broken line) and down into their lowered, open position (solid lines). The two connecting rods 45, 46 are pivotably mounted on one end to pivot around a respective transverse pivot axis 45', 46', the rods and axes being spaced apart from one another. The other end of connecting rods 45, 46 are pivotally connected to the cargo space door 44 in hinges with transverse pivot axes 45", 46" which are also spaced apart from one another. A drive means (not shown) swings the connecting rods 45, 46 or the can be manually operated with or without pneumatic or hydraulic cylinder assistance.

The cargo floor 16 is guided via a central lower guide rail 47, for example, by means of a telescoping mechanism. The side walls 17, 18 have wheels at a top edge thereof which are movably supported by a vehicle-mounted guide 48.

The cargo space door 44 contains a rear window 5 which can be lowered into the cargo space door 44. The opened cargo space door 44 (FIGS. 16, 18) is located in a space saving manner in its swung out and lowered position so that direct rear access to the cargo space and to the cargo floor 16 is almost unobstructed. Furthermore, a license plate 49, which is attached externally to the cargo space door 44, remains visible when the vehicle is being used with the cargo space door 44 swung out and down while driving.

Figures 14, 15, 16, 17:
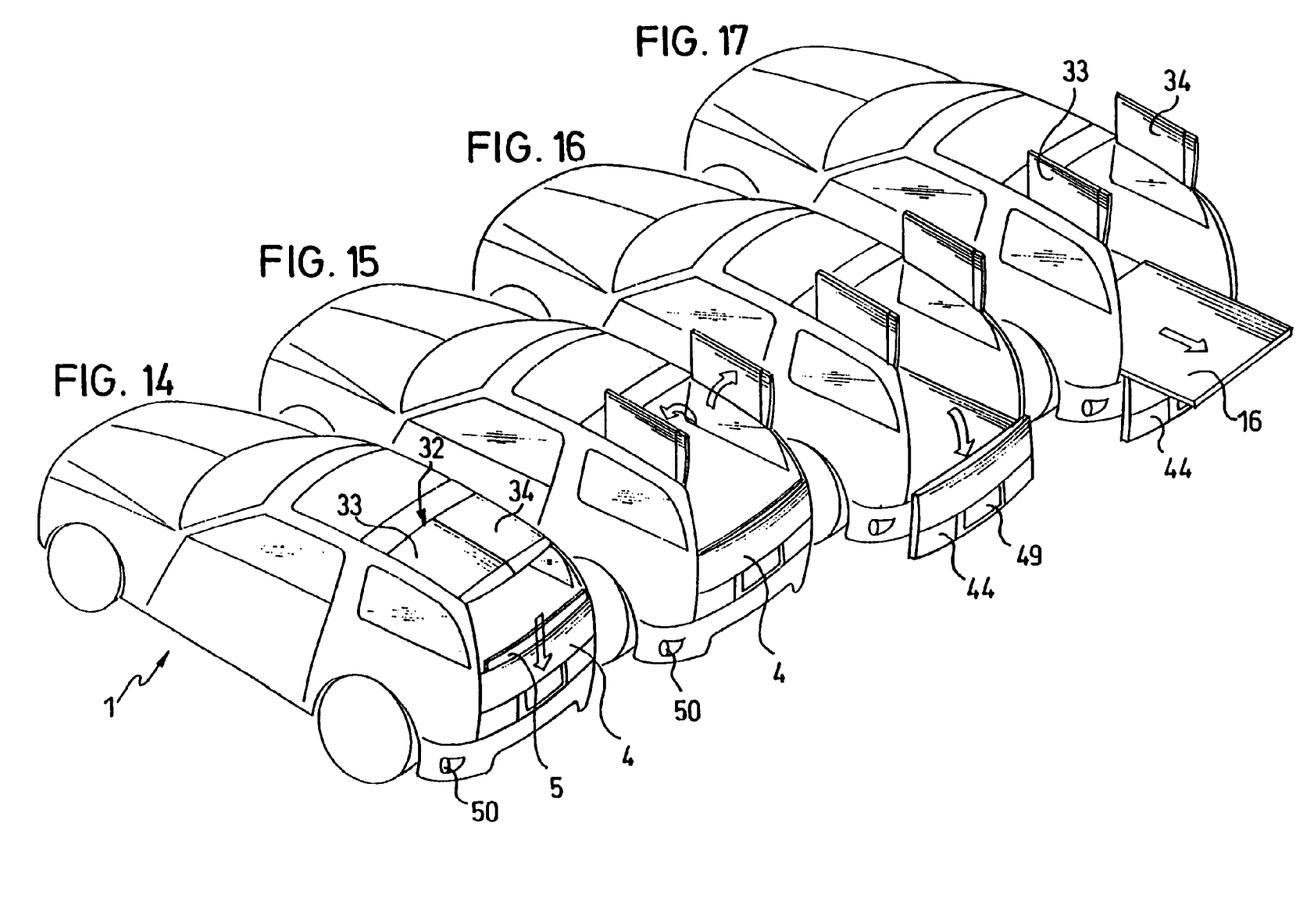
FIGS. 14 to 17 are perspective rear views of another embodiment of the station wagon with a cargo space door with modified support in different positions.

With the cargo space door 44 swung out and down, the cargo floor 16 can be pushed or extended to the rear (see FIG. 17), and the cargo floor 16 shown in FIG. 17 can be formed both with and also without side walls 17, 18.

The engine exhaust outlet 50, with the cargo space door 44 swung out and down, is located laterally offset outward of the cargo space door so that the flow of exhaust is not routed against the cargo space door 44, where it could flow into the cargo space, when the door is swung out and down.

All features of the different embodiments can be utilized in various other combinations to for additional versions, as a supplement to the described examples.

What is claimed is:

1. Passenger utility vehicle, comprising:
   a vehicle body with a cargo space which is located in a windowed rear cargo area of the vehicle body, said cargo area containing a movable cargo floor which can be extended rearwardly through a rear cargo space opening at a rear end of the vehicle body,
   at least one rear roof panel mounted for movement between a closed position closing a roof opening in a fixed roof surface of the vehicle body and an open position in which the roof opening is cleared, upwardly opening the cargo space, and
   a cargo space door mounted for movement between a closed position extending across the rear cargo space opening and an open position in which the cargo space is rearwardly open;
   wherein a continuous opening combining said rear cargo space opening and said roof opening is formed when both said at least one rear roof panel and said cargo space door are in the open position thereof; and
   wherein the cargo space door is mounted to the vehicle body by a pivot bearing means having an arc-shaped guide that produces a swinging motion about an effective vertical pivot axis that lies outside the cargo space door and rearward of vehicle body.

2. Passenger utility vehicle as claimed in claim 1, wherein the cargo floor is supported on each of the side walls via body-mounted guides.

3. Passenger utility vehicle as claimed in claim 1, wherein a drive means is provided for moving the cargo floor.

4. Passenger utility vehicle, comprising:
   a vehicle body with a cargo space which is located in a windowed rear cargo area of the vehicle body, said cargo area containing a movable cargo floor which can be extended rearwardly through a rear cargo space opening at a rear end of the vehicle body,
   at least one rear roof panel mounted for movement between a closed position closing a roof opening in a fixed roof surface of the vehicle body and an open position in which the roof opening is cleared, upwardly opening the cargo space, and
   a cargo space door mounted for movement between a vertical closed position extending across the rear cargo space opening and a vertical open position in which the cargo space is rearwardly open;
   wherein a continuous opening combining said rear cargo space opening and said roof opening is formed when both said at least one rear roof panel and said cargo space door are in the open position thereof; and
   wherein the cargo space door is mounted to the vehicle body by a four bar mechanism that is adapted to parallelly swing the cargo space door outward and downward from the vertical closed position to the vertical open position.

5. Passenger utility vehicle as claimed in claim 4, wherein said cargo space door is positioned in said open position at a location enabling the cargo floor to be extended outwardly above the cargo space door.

6. Passenger utility vehicle as claimed in claim 4, wherein the cargo floor is supported on each of the side walls via body-mounted guides.

7. Passenger utility vehicle as claimed in claim 4, wherein a drive means is provided for moving the cargo floor.

* * * * *